United States Patent [19]
Pessen

[11] 3,750,246
[45] Aug. 7, 1973

[54] COMPOSITE ROLL

[75] Inventor: David W. Pessen, Haifa, Israel

[73] Assignee: Gulf & Western Systems Company, New York, N.Y.

[22] Filed: Sept. 13, 1971

[21] Appl. No.: 179,963

[52] U.S. Cl........... 29/130, 29/113 AD, 29/116 AD
[51] Int. Cl............................................. B21b 31/08
[58] Field of Search.................. 29/132, 130, 129.5, 29/116 AD, 113 AD, 110

[56] References Cited
UNITED STATES PATENTS

| | | | |
|---|---|---|---|
| 41,851 | 3/1864 | Merritt | 29/129.5 |
| 242,058 | 5/1881 | Schurmann | 29/129.5 |
| 2,741,014 | 4/1956 | Hubbard | 29/130 |
| 2,800,959 | 7/1957 | Baker et al. | 29/130 X |
| 3,264,978 | 8/1966 | Staley | 29/132 X |
| 3,522,643 | 8/1970 | Winkler | 29/130 |

Primary Examiner—Alfred R. Guest
Attorney—Meyer, Tilberry and Body

[57] ABSTRACT

A composite roll for controlled deflection in calendering operations or the like to achieve an even nip includes an inner core member and a sleeve member received over the core member. At the central portion of the roll, both the core member and the sleeve are substantially cylindrical and tightly fitting together. On opposite sides of the central portion of the roll, either the outer peripheral surface of the core member, or the inner peripheral surface of the sleeve member, diverges from the other peripheral surface to form a space which varies in cross-sectional area proceeding from the central portion toward the opposite end portions of the roll. These annular spaces are filled with elastomeric material to achieve a substantially uniform spring rate along the entire length of the composite roll. The tightly fitting peripheral surfaces at the central portion of the roll maintain concentricity of the outer shell and prevent it from taking on a permanent eccentricity with respect to the core member.

17 Claims, 9 Drawing Figures

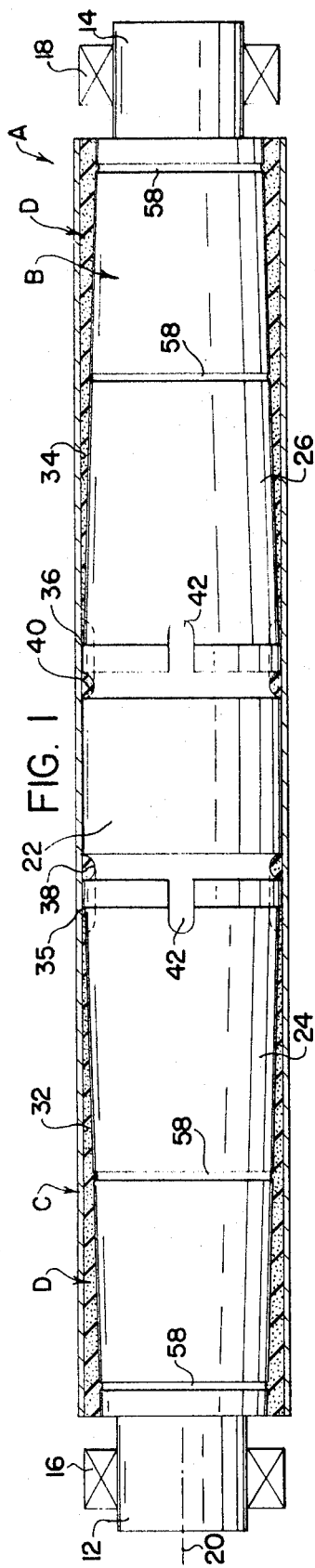
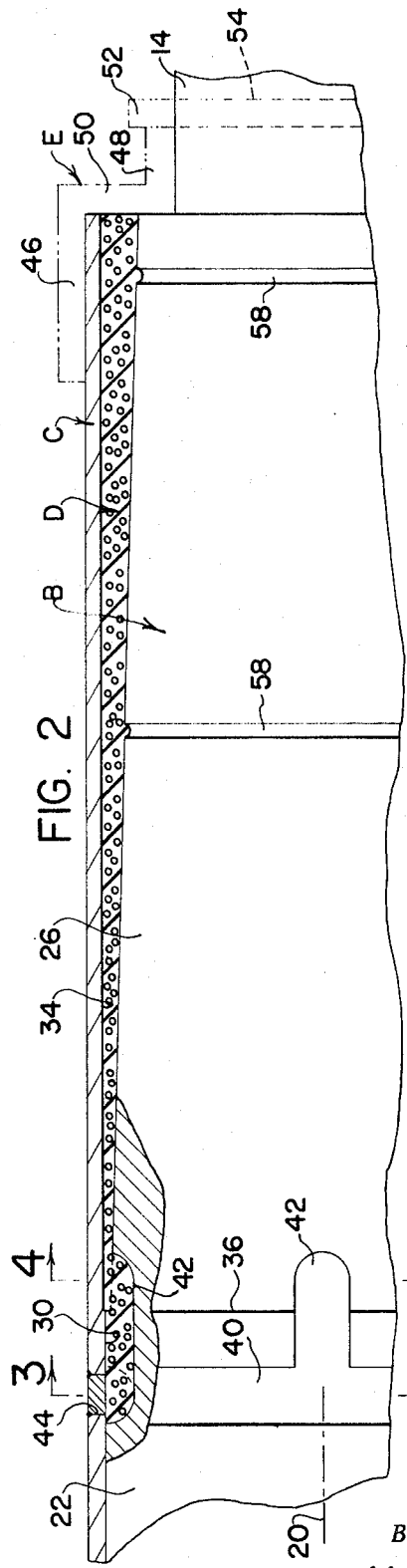
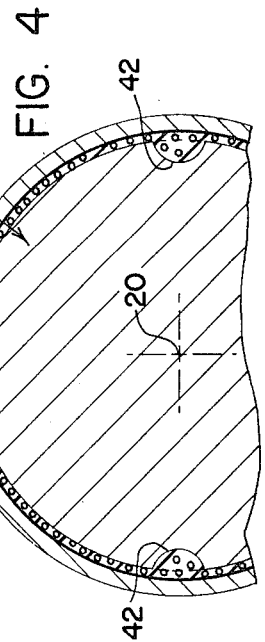
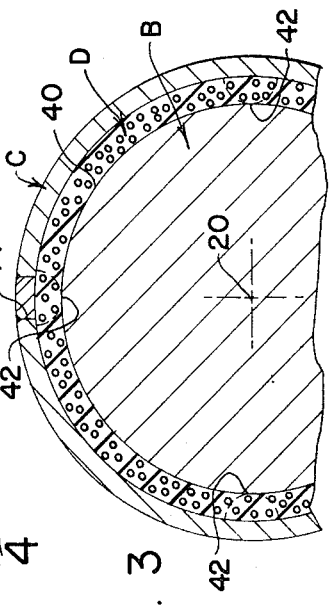
INVENTOR.
DAVID W. PESSEN
BY
Meyer, Tilberry & Body
ATTORNEYS INVENTOR.
DAVID W. PESSEN
BY
Meyer, Tilberry & Body
ATTORNEYS

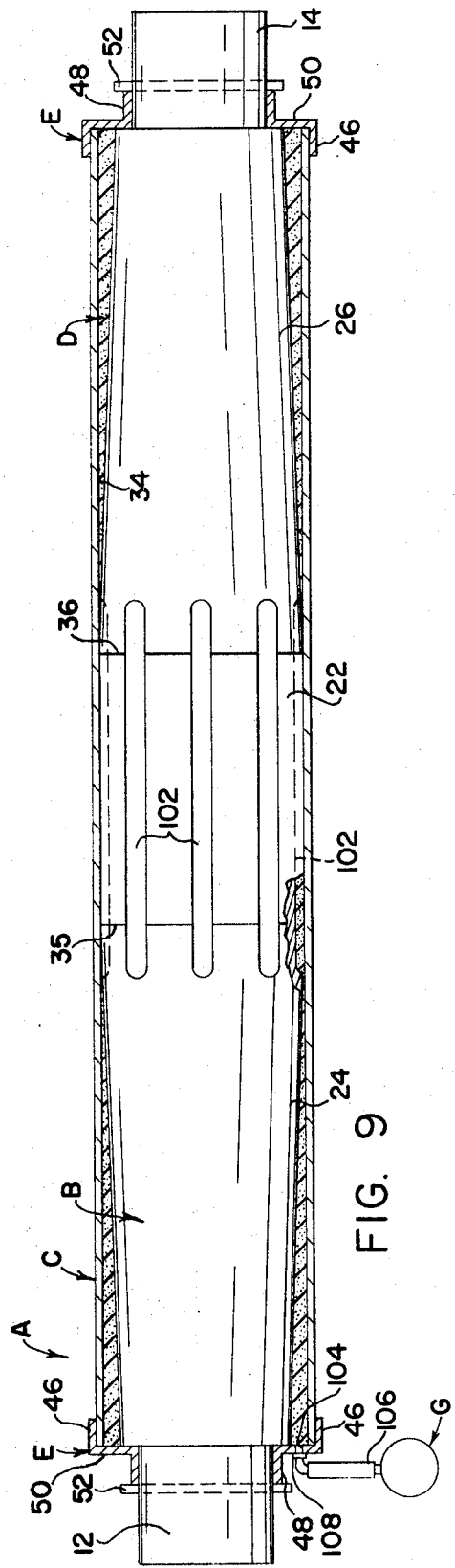
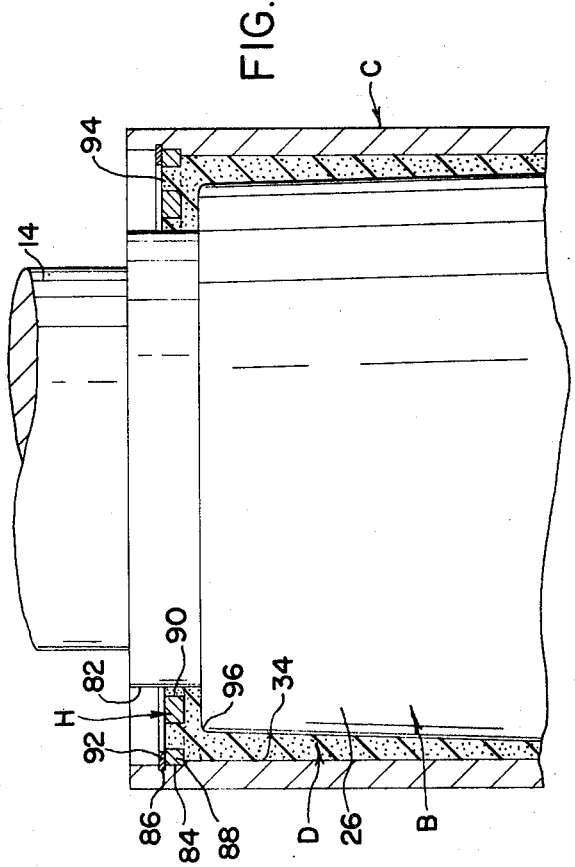

COMPOSITE ROLL

BACKGROUND OF THE INVENTION

This application pertains to the art of rolls and more particularly to composite rolls. The present invention is particularly applicable to composite rolls for use in dye-padding or calendering operations involving textile material or paper although it will be appreciated that the invention has broader applications and may be used for metal rolling or the like.

Rolls used in calendering or metal rolling operations deflect much in the manner of a simple beam about their end portions which are supported in bearings. Deflection of the roll is a maximum at its center so that an uneven nip is produced. That is, that portion of the roll in contact with the material being processed tends to take on a concave shape so that the pressure acting upon the material is not uniform. Machining a roll to an originally crowned or barrel shape is one way of accommodating for such deflection. However, a crowned roll of this type ordinarily achieves a uniform nip only for a certain predetermined loading condition. Other prior arrangements have included movable end bearings having hydraulic cylinders thereon along with backup rolls so that the nip of the rolls can be maintained in a straight line with varying loads and different materials.

Other arrangements for maintaining an even nip under varying loads include a composite roll having a metal core member and a metal sleeve applied thereover. Either the inner peripheral surface of the shell, or the outer peripheral surface of the core member, diverges from the other peripheral surface to produce an annular space which varies in cross-sectional area from the central portion of the roll toward the end portions thereof. One roll of this type is described in U.S. Pat. No. 3,230,604 to Woxvold. Such a roll is actually designed to give an even nip at only one given load value and is no different from the previously described crowned or barrel shaped roll. In such a roll, it is desirable that the shell touch the core member along its entire length so that the annular space disappears at the nip of the rolls. If the load is greater than that desired, the crown will be insufficient to cancel out the bending deflection of the core and an uneven nip pressure will result.

Other prior art composite rolls which attempt to achieve an even nip pressure under varying load, and to improve over the previously described Woxvold type of roll or the crowned roll, include composite rolls utilizing elastomeric material. In such rolls, a cylindrical shell is placed over a central metal shaft. The internal diameter of the shell is greater than the external diameter of the shaft to produce an annular space along the entire length of the roll. In previous arrangements of this type, either the outer peripheral surface of the shaft, or the inner peripheral surface of the shell, diverges from the other peripheral surface to produce an annular space which varies in cross-sectional area from the central portion of the roll toward the opposite end portions thereof. With a space which varies in cross-sectional area from the central portion of the roll toward the opposite end portions thereof, it is possible to achieve a substantially uniform spring rate along the entire length of the roll by filling the annular space with elastomeric material which is bonded to both the shaft and shell. That is, the modulus of elasticity of the elastomeric material is matched with the profile of the diverging surfaces in order to obtain uniform deflection along the entire length of the roll under varying load conditions. In such composite rolls, the elastomeric material produces an increased elastic force when the load increases. This elastic force always has the right magnitude to keep the shell straight and the nip even regardless of load when the core profile is properly calculated. Rolls of this previous type are described in U.S. Pat. No. 3,522,643 to Winkler. U.S. Pat. No. 2,187,250 to Sendzimir discloses a similar composite roll wherein the annular space between core and shell is filled with relatively soft metal. However, no metal has a low enough modulus of elasticity to produce the desired results. Another composite roll which includes an elastomeric material of varying thickness but no outer shell includes British Pat. 795,523.

Rolls of the type described have an annular space along the entire length of the roll which is filled with elastomeric material. The annular space varies in cross-sectional area from the central portion of the roll toward the opposite end portions thereof. This annular space of variable area provides elastomeric material which varies in thickness from the central portion of the roll toward the opposite end portions thereof. The elastomeric material produces an increased elastic force as the load increases and provides a force of the proper magnitude to keep the outer shell straight under varying loads. That is, the individual deflection or spring rate of the metal core member adds to the varying individual spring rate of the elastomeric material to give a constant spring rate for the composite roll along the entire length of the roll. This desirable phenomenon is further described in the previously mentioned prior art patents to Sendzimir, Winkler and British Pat. 795,523.

In composite rolls of the type described, the elastomeric material extends the full length of the roll between the inner core member and the outer shell. The previously described roll of the type including a shell and core member having an annular space of variable cross-section from the central portion toward the opposite end portions has certain drawbacks. Previous composite rolls utilizing elastomeric material between an inner core member and an outer shell resulted in an eccentricity of the outer shell which made the composite roll unsuitable for use in calendering operations or metal rolling operations.

Since the elastomeric material utilized in composite rolls behaves essentially like an incompressible fluid, thermal expansion and contraction produces tremendous pressures because the elastomeric material is bonded to both the shell and core. The elastomeric material tends to flow in the direction of any small cracks or voids which develop during operation of the roll. This flow of the elastomeric material is of a random nature and the elastomeric material tends to become slightly eccentric after a short period of operation of the roll. Eccentricity of the elastomeric layer also causes the outer shell to assume an eccentric shape which results in a non-uniform speed and pressure of the shell at the nip, and this is not suitable for industrial operations.

It would be desirable to have a roll which was capable of operating under varying load conditions to produce an even nip pressure and which would not become eccentric within a short time after normal use.

SUMMARY OF THE INVENTION

A composite roll of the type described utilizing elastomeric material includes an inner core member having an outer peripheral surface of varying shape to produce an annular space between the core member and the outer shell which varies in cross-section from the central portion of the roll toward the end portions thereof. In accordance with the invention, the outer peripheral surface of the core member, and the inner peripheral surface of the outer shell, are substantially cylindrical and of a diameter which provides a tight sliding fit at the central portion of the composite roll. At least one of either the outer peripheral surface of the core member, or the inner peripheral surface of the shell member, diverges from the other peripheral surface from the cylindrical central portions thereof toward the opposite end portions of the roll to provide an annular space which increases in cross-sectional area from the central portion of the roll toward the end portions thereof. These annular spaces are filled with elastomeric material which varies in thickness in accordance with the varying cross-sectional area of the space.

In accordance with the present invention, a composite roll of the type described has the outer peripheral surface of the core member, and the inner peripheral surface of the outer shell, dimensioned with a tight sliding fit at the central portion of the roll. In a preferred arrangement, both the outer peripheral surface of the core member, and the inner peripheral surface of the shell, have a substantially cylindrical surface at the central portion of the roll which extends over a length amounting to between 10–30 percent of the axial length of the composite roll.

In one arrangement, either the outer peripheral surface of the inner core member, or the inner peripheral surface of the shell member, are provided with circumferential grooves outwardly from the central portion of the roll so that the elastomeric material has a better grip on the shell and core member.

In accordance with a preferred arrangement, a predetermined arrangement of circumferential grooves and bores are formed in the core member and shell for filling the annular spaces on opposite sides of the central portion with elastomeric material.

It is a principle object of the present invention to provide an improved composite roll having a substantially uniform spring rate along its entire length.

It is another object of the present invention to provide an improved composite roll which will not become eccentric.

It is a further object of the present invention to provide an improved composite roll which maintains a uniform peripheral speed at the nip.

DESCRIPTION OF THE DRAWINGS

The invention may take physical form in certain parts and arrangements of parts, a preferred embodiment of which will be described in detail in this specification and illustrated in the accompanying drawings which form a part hereof.

FIG. 1 shows a cross-sectional front elevational view of a composite roll constructed in accordance with the present invention;

FIG. 2 is an enlarged cross-sectional front elevational view of the composite roll shown in FIG. 1;

FIG. 3 is a cross-sectional view looking in the direction of arrows 3—3 of FIG. 2;

FIG. 4 is a cross-sectional view looking in the direction of arrows 4—4 of FIG. 2;

FIG. 7 is a partial cross-sectional elevational view of another arrangement for an end portion of the composite roll;

FIG. 9 is a partial cross-sectional elevational view showing another arrangement for the central portion of the composite roll constructed in accordance with the present invention.

DESCRIPTION OF THE PREFERRED EMBODIMENT

Figure 5:
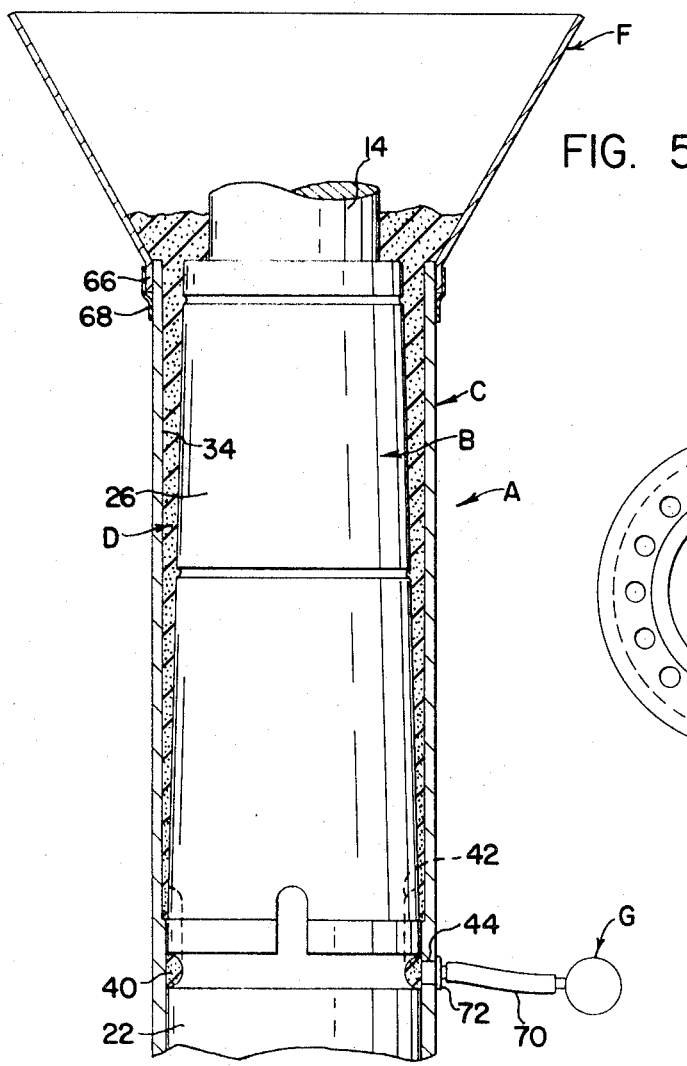
FIG. 5 is a partial cross-sectional elevational view showing another arrangement for filling an annular space with elastomeric material.
Figure 6:
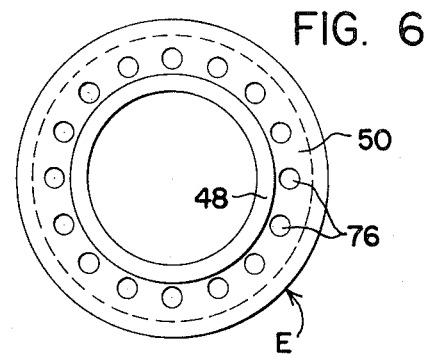
FIG. 6 is a top plan view of a collar used for maintaining alignment between a core member and a shell member during curing of elastomeric material.
Figure 8:
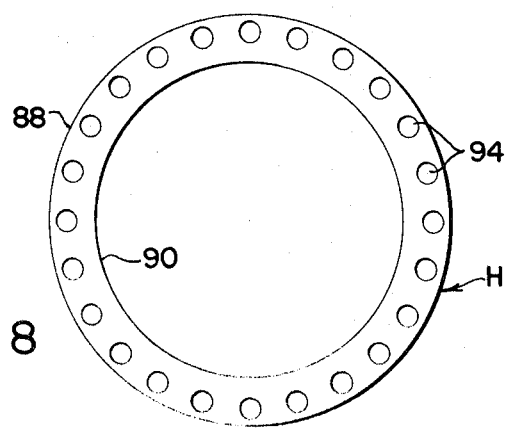
FIG. 8 is a top plan view of an end disc used with the end portion of the roll in FIG. 7.

Referring now to the drawings, wherein the showings are for purposes of illustrating the preferred embodiment of the invention only and not for purposes of limiting same, FIG. 1 shows a composite roll A which includes a metal shaft or core member B and a metal outer cylindrical shell C. Core member B includes opposite end portions 12 and 14 which are adapted to be mounted in bearings as at 16 and 18 when composite roll A is mounted in a calendering machine or the like. Core member B and shell member C have a substantially common longitudinal axis 20.

In accordance with a preferred arrangement, core member B has an outer peripheral surface which includes a central cylindrical portion 22, and side surface portions 24 and 26. Side surface portions 24 and 26 slope inwardly from central portion 22 toward opposite end portions 12 and 14. That is, side surface portion 24 may lie on the periphery of a cone having its larger diameter adjacent central portion 22 and its smaller diameter adjacent end portion 12, while side surface portion 26 lies on the periphery of a cone having its largest diameter adjacent central portion 22 and its smaller diameter adjacent end portion 14. The inner peripheral surface of shell member C is cylindrical so that outer peripheral surface portions 24 and 26 of core member B diverge away from the inner peripheral surface of shell member C when proceeding from central portion 22 toward opposite end portions 12 and 14. This produces an annular space between core member B and shell member C which increases in cross-sectional area when proceeding from central portion 22 toward opposite end portions 12 and 14. These annular spaces are filled with elastomeric material D which is bonded to the inner peripheral surface of shell member C, and peripheral surfaces 24 and 26 of core member B.

In accordance with a preferred arrangement, shell member C has a central cylindrical inner peripheral surface 30 of smaller diameter than cylindrical side surface portions 32 and 34. Central outer peripheral surface 22 of core member B is a tight sliding fit within central inner peripheral surface 30 of shell member C. With the arrangement described, it is possible to coat surfaces 24, 26, 32 and 34 with a bonding agent before shell member C is positioned over core member B. Inner peripheral side surface portions 32 and 34 of shell member C are of slightly larger diameter than central cylindrical portion 22 of core member B so that the bonding agent will not be scraped from surfaces 32 and 34 during positioning of shell member C over core member B. Central cylindrical portions 22 and 30 will then fit together with a tight sliding fit without disturbing any of the bonding agent previously applied to surfaces 32 and 34.

In the arrangement described, the central portion of the composite roll acts like a conventional rigid roll. Thus, the advantages of the composite roll principle are not used at the central portion of the roll. However, it has been found that the composite roll principle is not really needed at the central portion of a composite roll because bending deflection along the central portion is constant to within around one one thousandths of an inch. In the preferred arrangement, the constant diameter cylindrical central portions 22 and 30 extend over around 20 percent of the total composite roll length as measured between the end portions of shell member C. It is desirable that the constant diameter central cylindrical portions extend over between 10–30 percent of such total roll length. Tightly fitting central cylindrical portions 22 and 30 maintain shell member C in its desirable concentric alignment under all operating conditions and prevent shell member C from taking on a permanent eccentricity with respect to core member B.

In accordance with one arrangement, the central portion of the composite roll, defined by surfaces 22 and 30, has opposite terminations 35 and 36. Central cylindrical surface 22 of core member B is provided with a pair of spaced-apart circumferential grooves 38 and 40 spaced inwardly from terminations 35 and 36. A plurality of circumferentially spaced longitudinally extending grooves 42 connect grooves 38 and 40 with the annular spaces formed between surfaces 24 and 32, and 26 and 34. In the area of cylindrical central surface portion 30, shell member C is provided with radially extending holes, only one of which is indicated by numeral 44 in FIG. 2 spaced inwardly from terminations 35 and 36. Holes 44 are spaced-apart the same distance as grooves 38 and 40, and are positioned so as to be aligned with grooves 38 and 40 when core member B is in proper position within shell member C. A collar member E may then be positioned on sleeve member B. Collar E includes a large diameter flange portion 46 which tightly fits around an end portion of shell member C. Collar E further includes a small diameter flange portion 48 which tightly fits around end portion 14 of core member B. An integral circumferential connecting flange 50 connects flanges 46 and 48. A pin 52 may be placed through a suitable hole 54 in end portion 14 for holding collar E in position. Collar E will maintain concentric alignment between core member B and shell member C while the annular space is filled with elastomeric material. The composite roll is then placed with longitudinal axis 20 extending vertically, and with end portion 14 facing upwardly. Elastomeric material D is then injected through hole 44 in shell member C. Elastomeric material D then flows around circumferential groove 40 and through grooves 42 in order to fill the annular space between surfaces 26 and 34. Once this annular space is filled and the elastomeric material is cured, collar E may be removed and the roll inverted to fill the annular space defined between peripheral surfaces 24 and 32.

In one arrangement, inner core member B is formed with a plurality of longitudinally spaced circumferential grooves 58 in surface portions 24 and 26. These grooves become filled with elastomeric material D and provide a keying action which prevents elastomeric material D from being squeezed out of the annular space toward end portions 12 and 14 by the load applied during use, or by thermal expansion.

In accordance with another arrangement, the annular spaces between core member B and shell member C may be filled with elastomeric material D in a manner shown in FIG. 5. A funnel member F is placed over an end portion of shell member C and at small diameter end portion 66 is sealed thereto as by tape 68 which is wrapped around to seal funnel F to shell member C. A vacuum tube 70 connected to the inlet of a vacuum pump G is connected with hole 44 in shell member C by a suitable fitting 72. Elastomeric material D is then poured into funnel F where it will flow into the annular space between surface 26 of core member B and inner peripheral surface 34 of shell member C. The highly viscous elastomeric material may not readily flow into the annular space and completely fill the space. Therefore, vacuum pump G is operated to apply a vacuum which acts through circumferential groove 40 and longitudinal grooves 42 to suck elastomeric material D into the annular space. This will insure complete and uniform distribution of elastomeric material D throughout the entire annular space between outer surface 26 of core member B and inner peripheral surface 34 of shell member C. Once the annular space has been completely filled with elastomeric material D, funnel F and tape 68 may be removed so that collar E may be applied over the end portion of the composite roll as described with reference to FIG. 2 so that core member B and shell member C will be properly aligned while elastomeric material D cures. When elastomeric material D is a type which expands during curing, or contains a chemical blowing agent which produces expansion, collar member E preferably has a plurality of holes 76 formed through connecting flange 50 thereof. In a preferred arrangement, holes 76 have a total area which is at least 25 percent of the cross-sectional area of the annular space at the end portion of composite roll A. The annular space has a predetermined area between the terminal end edges of core member B and shell member C. Holes 76 have an area which is at least equal to 25 percent of that predetermined area in order to allow elastomeric material D to escape. A smaller area than this for holes 76 will constrain elastomeric material D within the annular space during expansion thereof. Such constraint may result in a non-uniform distribution of gas bubbles if the elastomeric material contains a chemical blowing agent. The absence of such holes in collar E will also result in a non-uniform density of elastomeric material D filling the annular space. Once elastomeric material D has cured, composite roll A is rotated 180° and the other annular space is filled with elastomeric material D in the same manner.

In accordance with another arrangement, circumferential keying grooves 58 may be omitted from core member B. An end disc arrangement may be provided at the end portions of composite roll A to prevent elastomeric material D from being squeezed out at the end portions thereof under load. One arrangement is shown in FIG. 7. It will be understood that both end portions of composite roll A are formed in the same manner as will be described with reference to FIG. 7. A cylindrical portion 82 is formed on the end portion of core member B. Inner peripheral surface 34 of shell member C is provided with a circumferential step 84 and a circumferential groove 86. A flat cylindrical end disc H is positioned around cylindrical portion 82 of core member B with its outer peripheral edge 88 received in circumferential step 84. Inner peripheral edge 90 of end disc H is spaced radially outward from cylindrical surface 82 so that relative deflection may take place between core member B and shell member C. A C-ring 92 is received in circumferential groove 86 and holds disc H in position against step 84. Disc H has a plurality of circumferentially spaced holes 94 therethrough. In a preferred arrangement, the annular space between core member B and shell member C has a predetermined area as measured across end edge 96 of core member B and inner peripheral surface 34 of shell member C. Holes 94 are equal to at least 25 percent of this predetermined area at the end portion of the annular space so that expansion of elastomeric material D will permit some elastomeric material to flow outward through holes 94 during curing thereof. The annular space may be filled with elastomeric material D in the same manner as described with reference to FIG. 5. End disc H may be positioned in the manner described either before or after elastomeric material D has been poured into the annular space. Once elastomeric material D has cured, it will be recognized that end disc H will prevent the solidified elastomeric material from being extruded out the end portions of composite roll A during use of roll A.

In accordance with another arrangement, it is possible to omit holes 44 through shell member C, and to omit circumferential and longitudinal grooves 38, 40 and 42 in core member B. In one arrangement, as shown in FIG. 9, cylindrical surface 22 of core member B has a plurality of longitudinally extending grooves 102 formed therein for interconnecting the annular spaces on opposite sides thereof. The total circumferential dimension for all of grooves 102 is preferably substantially less than the solid portions of surface 22 which lie on the periphery of a cylinder. With such an arrangement, central cylindrical portion 22 will still provide sufficient support to maintain concentricity of outer shell member C. When considering the total circumference of cylindrical portion 22, grooves 102 may occupy around one-fourth of that circumference. Instead of grooves 102, it will be recognized that it is also possible to drill holes through central cylindrical portion 22 beneath the outer surface thereof for interconnecting the annular spaces. However, it may then be desirable to also provide lateral holes in surfaces 24 and 26 directly adjacent terminations 35 and 36 of central cylindrical portion 22 so that the longitudinal holes therethrough will communicate with the lateral holes. In any event, it will be recognized that passageway means may be formed through central cylindrical portion 22 for interconnecting the annular spaces on opposite sides thereof. Collar E on one end portion of composite roll A may then have a hole 104 formed therethrough in communicating with the annular space at that end of roll A. A vacuum tube 106 from vacuum pump G is then connected by a suitable fitting 108 with hole 104. Roll A may then be positioned with its longitudinal axis extending vertically and with collar E having hole 104 therein facing downward. The funnel arrangement described with respect to FIG. 5 may then be used to pour elastomeric material into the annular space. Application of a vacuum by means of vacuum pump G will cause the elastomeric material to flow through passageways 102 and completely fill both of the annular spaces on opposite sides of central cylindrical portion 22.

It will be recognized that many other arrangements are also possible for applying a vacuum to the annular spaces during filling thereof with elastomeric material. For example, with respect to the arrangement shown in FIG. 1, a hole may be formed axially of core member B completely through end portions 12 and 14 up to circumferential grooves 38 and 40. One or more lateral holes formed in core member B at circumferential grooves 38 and 40 may then intersect the longitudinal hole. The longitudinal holes exiting at end portions 12 and 14 may then be connected with a vacuum tube and a vacuum will be applied through the longitudinal hole, the lateral holes at circumferential grooves 38 and 40, and axial grooves 42 so that each annular space may be filled separately as described with reference to FIG. 5 while a vacuum is applied thereto. This arrangement makes it possible to insure complete filling of the annular spaces with elastomeric material and insures a uniform distribution of gas bubbles therein without the need to form any holes in shell member C such as those at 44 in FIGS. 2 and 3.

Regardless of the arrangement for applying a vacuum to the annular spaces, it will be recognized that each arrangement includes passageway means formed in the composite roll for establishing communication with the pair of elongated annular spaces at positions adjacent the central portion of the roll from locations exteriorly of the roll.

It will be recognized that surfaces 22, 24 and 26 define the outer peripheral surface of core member B, and that this outer peripheral surface may be termed a first surface. Likewise, surfaces 30, 32 and 34 define the inner peripheral surface of shell member C, and this inner peripheral surface may be termed a second surface. The outer peripheral surface of core member B has been shown and described as diverging from the inner peripheral surface of shell member C. However, it is possible to reverse the arrangement so that the inner peripheral surface of shell C diverges from the outer peripheral surface of core member B. A combination arrangement wherein both surfaces diverge from one another from the central portion of the roll toward the opposite end portions is also possible. The diverging surfaces may also be curved rather than extending along straight lines.

In accordance with one arrangement, viscous elastomeric material D is vigorously mixed in order to cause the formation of air bubbles therein prior to pouring it into the annular space. This phenomenon occurs in the same manner as the formation of air bubbles in varnish or paint when it is vigorously mixed with the surface thereof exposed to air. Such air bubbles will be uniformly distributed throughout the viscous elastomeric material. Pouring such elastomeric material into the annular spaces, and the resulting cure, will then leave substantially uniformly distributed air bubbles throughout elastomeric material D.

In accordance with one arrangement, a controlled amount of a foaming agent is introduced into the elastomeric material prior to pouring thereof into the annular space. In the preferred arrangement, elastomeric material D occupies a predetermined volume in the annular spaces between core member B and shell C, and the air or gas bubbles comprise around ten to twenty percent of that predetermined volume. Upon curing of elastomeric material D, such elastomeric material will be securely bonded to inner peripheral surface 34 of shell C, and to outer peripheral surface portions 22, 24 and 26 of core member B.

In a preferred arrangement, air or gas bubbles are provided in sufficient quantity to accomodate the expansion or contraction volume change in elastomeric material D under thermal stress to which it will be subjected. For example, an elastomeric material which contracts around ten percent while curing at an elevated temperature will have sufficient air or gas bubbles to accomodate a ten percent volume change during curing without breaking the bond or otherwise fracturing the elastomeric material. For an elastomeric material which cures at room temperature, and will expand a predetermined percentage when subjected to high temperature use, sufficient air or gas bubbles are provided to accomodate that predetermined percentage expansion in volume without breaking the bond or otherwise fracturing the elastomeric material.

While the composite roll of the present invention may be constructed with any elastomeric material having the desirable properties, it has been found that the use of elastomeric material having uniformly distributed gas bubbles therein has many advantages. The use of an elastomeric material with uniformly distributed gas bubbles allows the elastomeric material to expand and contract without breaking the bond with the core and shell, and without causing cracks or voids to form therein. Such gas bubbles may be formed by vigorously mixing the elastomeric material prior to injection thereof into the annular space. It is also possible to use a small quantity of foaming agent in the elastomeric material to form such gas bubbles. It will be recognized that there are many different suitable elastomeric materials which may be used in the composite roll of the present invention. Suitable types of elastomeric materials which may be utilized include natural or neoprene rubber, urethane elastomer or styrene butadiene. Any suitable bonding agent may be used, such as epoxy, phenolic or rubber base adhesives. Gas bubbles may be formed in the elastomeric material with any suitable chemical blowing agents such as sulfonyl hydrazide, azobisformamide or N-Nitroso compounds.

In one arrangement, composite rolls constructed in accordance with the present invention have been formed using silicone rubber and have been found satisfactory. One type of such silicone rubber is identified as silastic E-RTV rubber available from Dow Corning Corporation. High temperature acrylic rubbers, such as Hycar, a trademark for acrylic rubber manufactured by Goodyear Corporation, can also be used. One foaming agent used with the silicone rubber described is Dow Corning Corporation's silastic S-5370 RTV foam. The application of vacuum to the annular space in the manner described with reference to FIG. 5 has been found to provide a very uniform distribution of gas bubbles throughout the elastomeric material when a chemical blowing agent is used. Acrylic, expoxy or silane primers may be used to achieve a good bond between the elastomeric material and the surfaces of the core and shell members. One primer used with silicone rubber is silastic 1202 silicone primer, available from Dow Corning Corporation.

In one arrangement, eight parts of the described silastic foam per one hundred parts of the described silastic rubber has been found to produce a gas bubble content of around fourteen percent. This percentage has been found to be satisfactory under operating conditions. It is desirable that the elastomeric material contain more gas bubbles than are necessary to accommodate the compression to which the elastomeric material will be subjected. For example, if a six percent expansion of the elastomeric material is expected, having only 6 percent gas bubbles would mean that each bubble must be compressed to zero volume. This would increase the pressure of the gas trapped inside each bubble to an infinite pressure. Therefore, accommodation of a 6 percent expansion in the elastomeric material makes it desirable to approximately double the necessary bubble content to around 12 percent. The use of eight parts of foam per 100 parts of silastic rubber produces a bubble content of around fourteen percent which is satisfactory in one application. The use of pressure for injecting the elastomeric material into the annular spaces has been found unsatisfactory. It is believed that the use of pressure causes the gas formed by the foaming agent to dissolve into the liquid elastomeric material. Even though the pressure is released after the liquid elastomeric material has completely filled the annular space, the gas remains absorbed in the liquid. Vigorous stirring of the elastomeric material will release some of the gas bubbles but they then tend to collect along the metal surfaces of the inner core and outer shell. The use of a vacuum arrangement as described has been found to be an optimum arrangement for completely filling the annular spaces with elastomeric material and produces an arrangement in which the gas bubbles are substantially uniformly distributed throughout the elastomer.

While the invention has been described with reference to a preferred embodiment, it is obvious that alterations and modifications will occur to others skilled in the art upon the reading and understanding of this specification. The present invention includes all such equivalent alterations and modifications and is limited only by the scope of the claims.

Having thus described my invention, I claim:

1. A composite roll comprising: a substantially rigid elongated core member having an outer peripheral surface defining a first surface, a substantially rigid elongated outer shell positioned over said core member and having an inner peripheral surface defining a second surface, said core member and shell having a substantially common longitudinal axis, said roll having a central portion and opposite end portions, at least one of said first and second surfaces diverging from the other of said surfaces along said longitudinal axis from said central portion of said roll to said opposite end portions thereof to define an annular space between said core member and shell, elastomeric material filling said annular space, said elastomeric material having substantially uniformly distributed air bubles therein, and substantially rigid end disc means for substantially closing said annular space at said opposite end portions of said roll to substantially prevent expansion of said elastomeric material out said opposite end portions.

2. The roll of claim 1 wherein said annular space has a predetermined area at said opposite end portions of said roll, said end disc means having a plurality of openings therethrough, said openings having an area around one-fourth as great as said predetermined area.

3. The roll of claim 1 wherein said end disc means include inner peripheral surfaces facing said outer peripheral surface of said core member to define a first pair of facing surfaces and outer peripheral surfaces facing said inner peripheral surface of said shell to define a second pair of facing surfaces, at least one of said pair of facing surfaces being radially spaced for allowing relative deflection between said core member and said shell at said outer end portions of said roll.

4. The roll of claim 1 wherein said inner peripheral surface of said shell and said outer peripheral surface of said core member are of substantially the same size and tightly fit relative to one another at said central portion of said roll.

5. The roll of claim 4 wherein at least one of said first and second surfaces includes passageway means therein at said central portion of said roll for interconnecting said annular space on opposite sides of said central portion.

6. The roll of claim 1 wherein said elastomeric material filling said annular space has a predetermined volume and said bubbles comprise from 10 to 20 percent of said volume.

7. The roll of claim 1 wherein said elastomeric material has a predetermined volume change under thermal stress during use of said roll and said bubbles are provided in sufficient quantity to accommodate said volume change.

8. A composite roll comprising; an inner core member having an outer peripheral surface defining a first surface, an outer shell positioned over said core member and having an inner peripheral surface defining a second surface, said core member and said shell having a substantially common longitudinal axis, said roll having a central portion and opposite end portions, at least one of said first and second surfaces diverging from the other of said first and second surfaces along said longitudinal axis from said central portion of said roll to said opposite end portions thereof to define a pair of elongated annular spaces, elastomeric material filling said spaces, and at least one of said first and second surfaces having circumferential grooves formed therein in the area of said annular spaces.

9. The roll of claim 8 wherein said first and second surfaces are substantially the same size and tightly fitting relative to one another at said central portion of said roll.

10. A composite roll comprising; an inner core member having an outer peripheral surface defining a first surface, an outer shell positioned over said core member and having an inner peripheral surface defining a second surface, said core member and said shell having a substantially common longitudinal axis, said roll having a central portion and opposite end portions, said first and second surfaces being substantially the same size and tightly fitting relative to one another at said central portion of said roll, at least one of said first and second surfaces diverging from the other of said first and second surfaces along said longitudinal axis from said central portion of said roll to said opposite end portions thereof to define a pair of elongated annular spaces, elastomeric material filling said spaces, said first and second surfaces being cylindrical at said central portion of said roll, and at least one of said first and second surfaces having passageway means formed therein at said central portion of said roll for interconnecting said pair of elongated annular spaces.

11. A composite roll comprising; an inner core member having an outer peripheral surface defining a first surface, an outer shell positioned over said core member and having an inner peripheral surface defining a second surface, said core member and said shell having a substantially common longitudinal axis, said roll having a central portion and opposite end portions, said first and second surfaces being substantially the same size and tightly fitting relative to one another at said central portion of said roll, at least one of said first and second surfaces diverging from the other of said first and second surfaces along said longitudinal axis from said central portion of said roll to said opposite end portions thereof to define a pair of elongated annular spaces, elastomeric material filling said spaces, and passageway means formed therein for establishing communication with said pair of elongated annular spaces adjacent said central portion of said roll from locations exteriorly of said roll.

12. The roll of claim 11 wherein said central portion of said roll has opposite terminations, said passageway means including at least one hole formed through said shell adjacent each of said terminations, a pair of circumferential grooves formed in said core member in alignment with said holes, and axially extending grooves formed in said core member extending from said grooves to said annular spaces.

13. A composite roll comprising; a substantially rigid elongated core member having an outer peripheral surface, a substantially rigid elongated outer shell positioned over said core member and having an inner peripheral surface spaced radially outward from said peripheral surface of said core member to define an elongated annular space having a predetermined volume, said roll having a central portion and opposite end portions, at least one of said surfaces diverging from the other of said surfaces from said central portion toward said opposite end portions, elastomeric material bonded to said peripheral surfaces and substantially filling said annular space, and said elastomeric material having substantially uniformly distributed gas bubbles therein occupying 10–20 percent of said predetermined volume for allowing said elastomeric material to expand and contract under mechanical and thermal stress without fracturing.

14. The roll of claim 13 wherein said roll has a substantially constant spring rate throughout its length.

15. The roll of claim 13, and further including substantially rigid end closure means for substantially closing said annular space at said opposite end portions to prevent expansion of said elastomeric material out said end portions.

16. The roll of claim 13 wherein said peripheral surfaces are of substantially the same size and fit tightly relative to one another at said central portion.

17. The roll of claim 16 wherein said roll has a predetermined axial length, said peripheral surfaces of substantially the same size extending over not less than ten percent and not greater than 30 percent of said predetermined axial length.

* * * * *